(12) United States Patent
Yamamura

(10) Patent No.: US 12,419,214 B2
(45) Date of Patent: Sep. 23, 2025

(54) UTILITY VEHICLE

(71) Applicant: Honda Motor Co., Ltd., Tokyo (JP)

(72) Inventor: Makoto Yamamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 14 days.

(21) Appl. No.: 15/473,484

(22) Filed: Mar. 29, 2017

(65) Prior Publication Data

US 2017/0280622 A1 Oct. 5, 2017

(30) Foreign Application Priority Data

Mar. 31, 2016 (JP) ................................. 2016071941

(51) Int. Cl.
| | | |
|---|---|---|
| *G06Q 10/00* | (2023.01) | |
| *A01D 34/00* | (2006.01) | |
| *G06Q 10/0631* | (2023.01) | |
| *G05D 1/00* | (2006.01) | |

(52) U.S. Cl.
CPC ..... *A01D 34/008* (2013.01); *G06Q 10/06311* (2013.01); *G05D 1/0088* (2013.01)

(58) Field of Classification Search
CPC ........... A01D 34/008; G06Q 10/06311; G06Q 10/06312; G06Q 10/109; G05D 2201/0215; G05D 1/0088
USPC ....................................................... 705/7.13
See application file for complete search history.

(56) References Cited

U.S. PATENT DOCUMENTS

| | | | | |
|---|---|---|---|---|
| 8,295,979 B2 * | 10/2012 | Thacher | ............... | A01B 79/005 |
| | | | | 701/25 |
| 2007/0293152 A1 | 12/2007 | Rosen et al. | | |
| 2008/0126067 A1 * | 5/2008 | Haas | ....................... | G06F 30/20 |
| | | | | 703/17 |
| 2008/0183349 A1 * | 7/2008 | Abramson | ........... | A01D 34/008 |
| | | | | 901/30 |
| 2010/0199622 A1 * | 8/2010 | Hunt | .................... | A01D 69/025 |
| | | | | 180/65.21 |
| 2011/0166701 A1 * | 7/2011 | Thacher | ................. | A01G 25/00 |
| | | | | 700/245 |
| 2011/0166715 A1 * | 7/2011 | Hoffman | ................ | A01G 25/16 |
| | | | | 700/284 |

(Continued)

FOREIGN PATENT DOCUMENTS

| | | |
|---|---|---|
| EP | 1647175 A1 | 4/2006 |
| EP | 2342964 A1 | 7/2011 |

(Continued)

OTHER PUBLICATIONS

Y. Y. Huang, Z. L. Cao, S. J. Oh, E. U. Kattan, and E. L. Hall "Automatic Operation for a Robot Lawn Mower", Proc. SPIE 0727, Mobile Robots I, (Feb. 25, 1987) (Year: 1987).*

(Continued)

*Primary Examiner* — Timothy Padot
*Assistant Examiner* — Reham K Abouzahra
(74) *Attorney, Agent, or Firm* — Duft & Bornsen, PC

(57) ABSTRACT

In a utility vehicle that runs a working area to perform work with a work unit comprising a blade and work motor it is determined whether load of the work unit in work performed in accordance with an established work schedule is equal to or less than a predetermined value, and the established work schedule is adjusted to reduce work when it is determined that the load is equal to or less than the predetermined value.

3 Claims, 9 Drawing Sheets

(56) References Cited

U.S. PATENT DOCUMENTS

| | | | | |
|---|---|---|---|---|
| 2011/0224935 A1* | 9/2011 | Hampel | ............. | G01D 4/004 |
| | | | | 702/85 |
| 2012/0023887 A1* | 2/2012 | Messina | ............. | B60L 3/0061 |
| | | | | 56/320.1 |
| 2013/0046525 A1* | 2/2013 | Ali | ............. | G05D 1/0221 |
| | | | | 703/6 |
| 2013/0167495 A1* | 7/2013 | Borinato | ............. | A01D 69/02 |
| | | | | 56/10.2 G |
| 2015/0296707 A1 | 10/2015 | Fukuda et al. | | |
| 2015/0338852 A1* | 11/2015 | Ramanujam | ............. | G01C 21/26 |
| | | | | 701/2 |
| 2017/0020064 A1* | 1/2017 | Doughty | ............. | A01G 25/09 |

FOREIGN PATENT DOCUMENTS

| | | | | |
|---|---|---|---|---|
| EP | 2425701 A2 * | 3/2012 | ............. | A01D 34/74 |
| EP | 2767150 A1 | 8/2014 | | |
| EP | 1933467 A2 | 3/2017 | | |
| EP | 3520593 A1 * | 8/2019 | ............. | A01D 34/008 |
| JP | 2007318867 A | 12/2007 | | |
| JP | 2013017437 A | 1/2013 | | |
| JP | 2014103932 A | 6/2014 | | |
| WO | WO-2013107374 A1 * | 7/2013 | ............. | A01D 34/008 |
| WO | 2014129941 A1 | 8/2014 | | |

OTHER PUBLICATIONS

C. Fiedler, "Scheduling of robotic flow shops with sequence dependent setup times based on correlation functions," 2007 46th IEEE (Year: 2007).*

Husqvarna Automower 305/308/320/330X Operator's Manual, copyrighted and published 2014.

Husqvarna Automower 320/330Z Operator's Manual, copyrighted and published 2013.

* cited by examiner

UTILITY VEHICLE

CROSS-REFERENCE TO RELATED APPLICATIONS

This application is based upon and claims the benefit of priority from Japanese Patent Application No. 2016-071941 filed on Mar. 31, 2016, the contents of which are incorporated herein by reference.

BACKGROUND OF THE INVENTION

Field of the Invention

This invention relates to a utility vehicle that runs a working area to perform work with a work unit.

Description of Related Art

A prior art control apparatus for a utility vehicle of this type can be found, for example, in International Unexamined Patent Publication WO 2014/129941A1. The prior art disclosed in the reference relates to a utility vehicle equipped with a lawn mowing machine having a height-adjustable blade and adapted to control to a slower running speed in accordance with working area inclination.

In the case of a utility vehicle like that described in the reference, the condition of the serviced working area changes with season of the year. When the serviced area is a lawn, for example, work time can be shortened during autumn and winter because the grass grows slower than during spring and summer. Although the user should advisably regularly adjust the work schedule, such adjustment is troublesome.

SUMMARY OF THE INVENTION

Therefore, the object of this invention is to provide a utility vehicle that automatically adjusts a work schedule established by a user.

In order to achieve the object, this invention provides a utility vehicle that runs a working area to perform work with a work unit and method for controlling its operation, it is determined whether load of the work unit in work performed in accordance with an established work schedule is equal to or less than a predetermined value, and the established work schedule is adjusted to reduce work when it is determined that the load is equal to or less than the predetermined value.

BRIEF DESCRIPTION OF THE DRAWINGS

The above and other objects and advantages will be more apparent from the following description and drawings, in which.

DETAILED DESCRIPTION OF THE INVENTION

A utility vehicle according to an embodiment of this invention is explained with reference to the attached drawings in the following.

Figure 1:
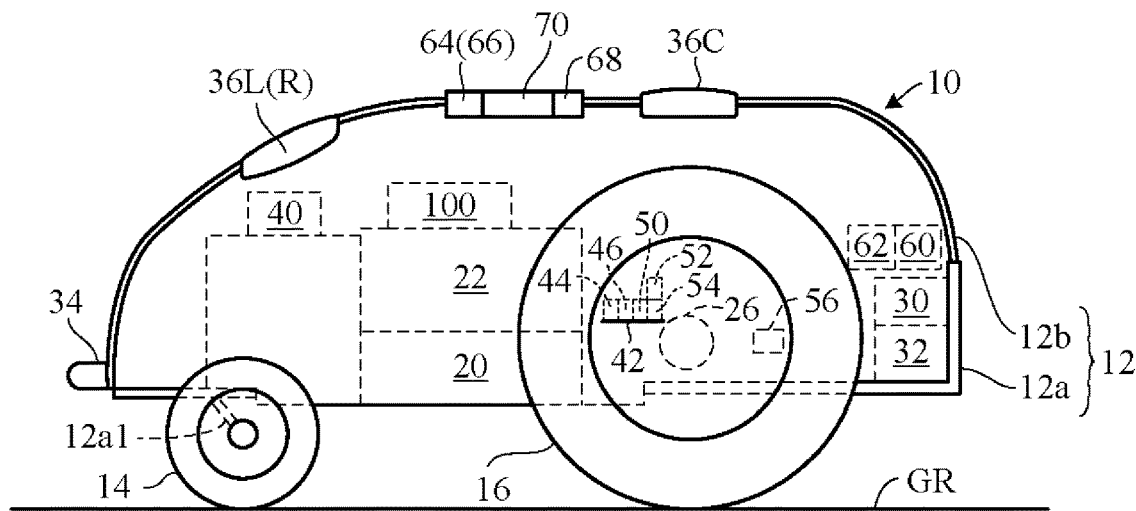
FIG. 1 is an overall schematic diagram showing a utility vehicle according to an embodiment of this invention.
Figure 2:
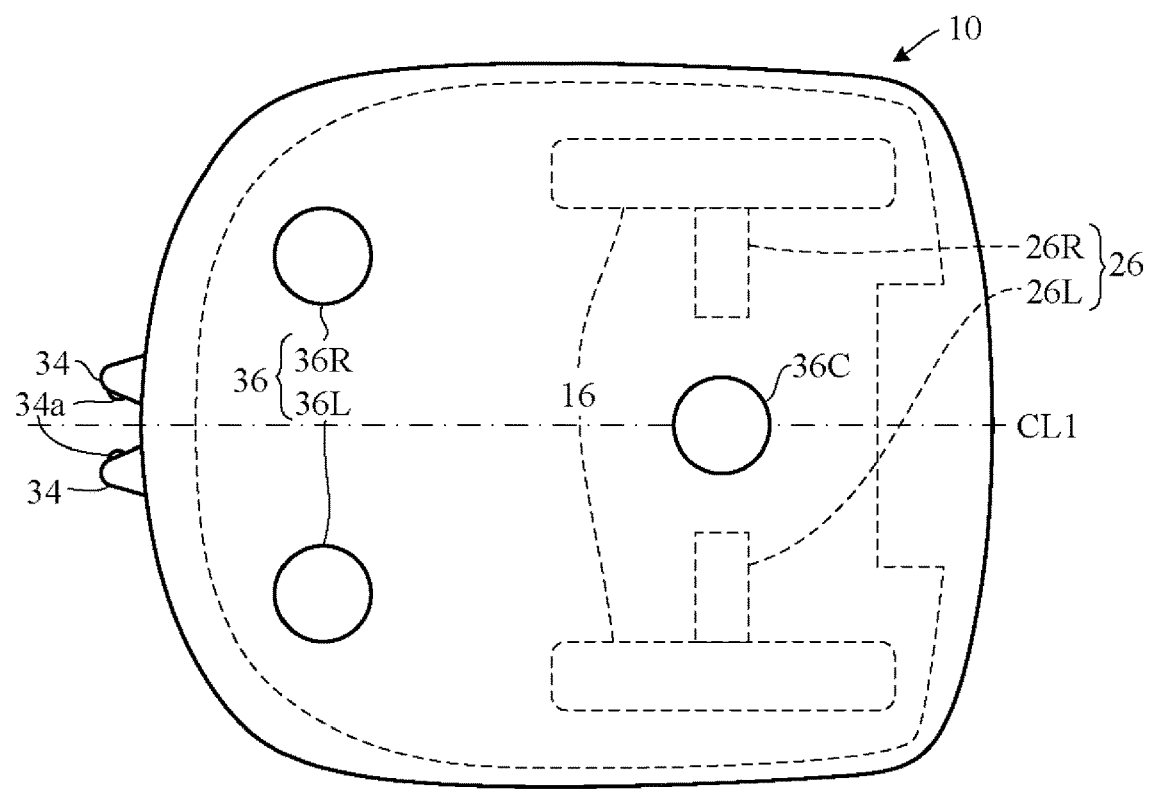
FIG. 2 is a plan view of the utility vehicle illustrated in FIG. 1.
Figure 3:
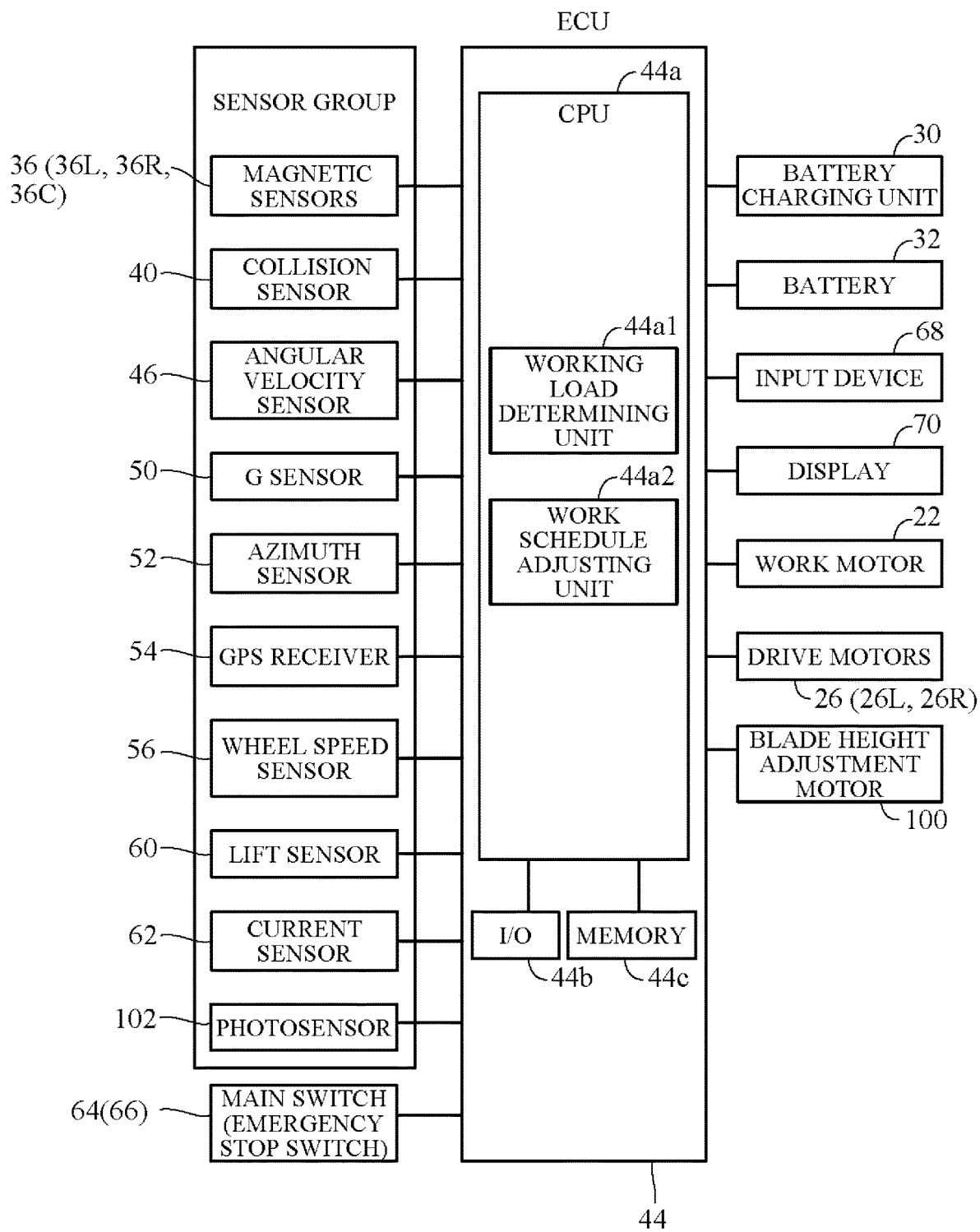
FIG. 3 is a block diagram showing inputs to an Electronic Control Unit installed in the utility vehicle illustrated in FIG. 1.

FIG. 1 is an overall schematic diagram showing a utility vehicle according to an embodiment of this invention, FIG. 2 is a plan view schematically illustrating the configuration of the utility vehicle illustrated in FIG. 1; and FIG. 3 is a block diagram showing the configuration of the utility vehicle according to the present embodiment including an Electronic Control Unit.

As shown in FIG. 1, reference symbol 10 designates a utility vehicle, more precisely an autonomously navigating utility vehicle, e.g., a mower; hereinafter called "vehicle".

The utility vehicle of the present invention can be embodied in the form of various types of utility vehicle and particularly as an autonomously navigating utility vehicle as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

A body 12 of the vehicle 10 comprises a chassis 12a and a frame 12b attached thereto. The vehicle 10 is equipped with relatively small diameter left and right front wheels 14 rotatably fastened to a front end of the chassis 12a through stays 12a1 and relatively large diameter left and right rear wheels 16 rotatably fastened to the chassis 12a directly.

A work unit, e.g., a mower blade (rotary blade) 20, is attached near the middle of the chassis 12a of the vehicle 10, and an electric motor (hereinafter called "work motor") 22 is installed above it. The blade 20 is connected to the electric motor 22 to be driven to rotate by the electric motor 22.

Two electric motors (hereinafter called "drive motors") 26 are attached to the chassis 12a of the vehicle 10 at a rear end of the blade 20. The drive motors 26 are connected to the left and right rear wheels 16 and rotate normally (drive the vehicle 10 to run forward) or reversely (drive the vehicle 10 to run backward) independently on the left and right, with the front wheels 14 as non-driven (free) wheels and the rear wheels 16 as driven wheels. The blade 20, work motor 22, drive motors 26 and so on are covered by the frame 12b.

The weight and size of the vehicle 1 are such that it can be transported or carried by the user. As an example can be cited a vehicle 1 whose total length (forward-rearward direction length) is about 710 mm, total width about 550 mm, and height about 300 mm.

A battery charging unit 30 and an onboard battery 32 are housed at the rear of the vehicle 10, and a pair of charging terminals 34 are attached to the frame 12b so as to project forward. The battery 32 comprises lithium-ion battery, for example.

The charging terminals 34 are connected to the charging unit 30 through cables, and the charging unit 30 is connected to the battery 32 by cables. The work motor 22 and the drive motors 26 are connected to the battery 32 through connecting cables and are supplied with current from the battery 32. The cables are not shown in FIG. 1.

The vehicle 10 is thus configured as a 4-wheel, electrically-powered, autonomously navigating utility vehicle.

Left and right magnetic sensors 36 are installed at the front of the body 12 of the vehicle 10 at positions laterally symmetrical with respect to a center line extending in the straight forward direction of the vehicle 10. More specifically, as shown in FIG. 2, the first and second magnetic sensors 36R and 36L are installed laterally symmetrically with respect to a center line CL running in the straight forward direction along the widthwise center of the vehicle 10. In addition, a third magnetic sensor 36C is installed on the center line CL1 at a location remote from the sensors 36L and 36R. The magnetic sensors 36 produces an output indicating magnitude of magnetic field (magnetic field strength or intensity).

A collision (contact) sensor 40 is attached to the frame 12b. The collision sensor 40 outputs an ON signal when the frame 12b detaches from the chassis 12a owing to collision (contact) with an obstacle or foreign object.

A housing box (not shown) installed near the middle of the vehicle 10 houses a printed circuit board 42 carrying an ECU (Electronic Control Unit) 44, which comprises a microcomputer having CPU (microprocessor) 44a, I/O 44b, and memory (ROM, RAM, EEPROM, etc.) 44c and the like.

In the vicinity of the ECU 44 are installed an angular velocity sensor (yaw-rate sensor; yaw sensor) 46 that generates an output indicating angular velocity (yaw-rate) around a center-of-gravity z-axis (vertical axis) of the vehicle 10 (whose time-integrated value indicates a turn angle around the vertical axis), a G sensor (acceleration sensor) 50 that generates an output indicating acceleration G acting on the vehicle 10 in x, y and z (3-axis) directions, a direction sensor 52 that generates an output indicating direction (azimuth) of the vehicle 10 according to terrestrial magnetism, and a GPS (Global Positioning System) receiver 54 that receives satellite-transmitted GPS signals indicating position of the vehicle 10 (the GPS receiver 54 functions as a position sensor that detects position of the vehicle 10).

Wheel speed sensors 56 installed near the rear wheels 16 produce outputs indicating the wheel speeds of the rear wheels 16, and a lift sensor 60 installed between the chassis 12a and the frame 12b outputs an ON signal when the frame 12b is lifted off the chassis 12a by the user or other worker. The vehicle 10 is equipped with a main switch 56 and an emergency stop switch 60 both operable by the user. A current sensor 62 is installed at input/output circuit of the battery 32 and produces an output indicating consumed current of the battery 32.

A main switch 64 for inputting various commands of the user, inter alia, start of operation, and an emergency stop switch 66 for inputting command for stopping the vehicle 10 in case of emergency are installed on the vehicle to be manipulatable by the user. The top of the frame 12b of the vehicle 10 has a large cutaway in which an input device 68 for inputting commands of the user and a display 70 is fitted. The input device 68 and display 70 are connected to the ECU 44. The display 70 displays working modes and the like in accordance with commands sent from the ECU 44.

As shown in FIG. 3, the outputs of the magnetic sensors 36, collision sensor 40, angular velocity sensor 46, etc., are sent to the ECU 44 through the I/O 44b. Based on the inputted data, the ECU 44 controls operation of the vehicle 10 by supplying current to the drive motor 26 from the battery 32 and by sending commands thereto through the I/O 44b. An external device (e.g., smartphone) 100 operable by the user can be made connectable to the ECU 44 as indicated by imaginary lines in FIG. 3.

Output shafts of the drive motors 26L and 26R are connected to rotating shafts of the left and right rear wheels 16, respectively, so as each to independently drive or rotate the left or right rear wheel 16. The drive motors 26L and 26R are configured such that they each independently rotates one of the rear wheels 16 normally (drive the vehicle 10 to run straight forward) or reversely (drive the vehicle 10 to run reverse). By establishing a difference between the rotating speeds of the left and right rear wheels 16, the vehicle 10 can be turned to an arbitrary direction.

For example, when the left and right rear wheels 16 are both rotated normally and the rotational speed of the right rear wheel 16 is greater than the rotational speed of the left rear wheel 16, the vehicle 10 turns left at a turning angle θ in accordance with the speed difference. Conversely, when the rotational speed of the left rear wheel 16 is greater than the rotational speed of the right rear wheel 16, the vehicle 10 turns right at a turning angle θ in accordance with the speed difference. When one of the left and right rear wheels 16 is rotated normally and the other reversely both at the same speed, the vehicle 10 turns on the spot (so-called "pivot-turn").

The vehicle 10 is configured to detect or recognize the working area AR based on the outputs of the aforesaid sensors, in particular the electromagnetic sensors 36 and perform the work in the working area AR.

The detection of the working area AR and the work thereat will be explained with reference to FIG. 4.

The working area 70 is delineated by laying (burying) a boundary wire (electrical wire) 72 around its periphery (boundary). A charging station 76 for charging the battery 32 of the vehicle 10 is installed above the boundary wire 72 at a location inside or outside, more precisely inside the working AR. The sizes of the vehicle 10 and charging station 76 in FIG. 4 are exaggerated.

Figure 5:
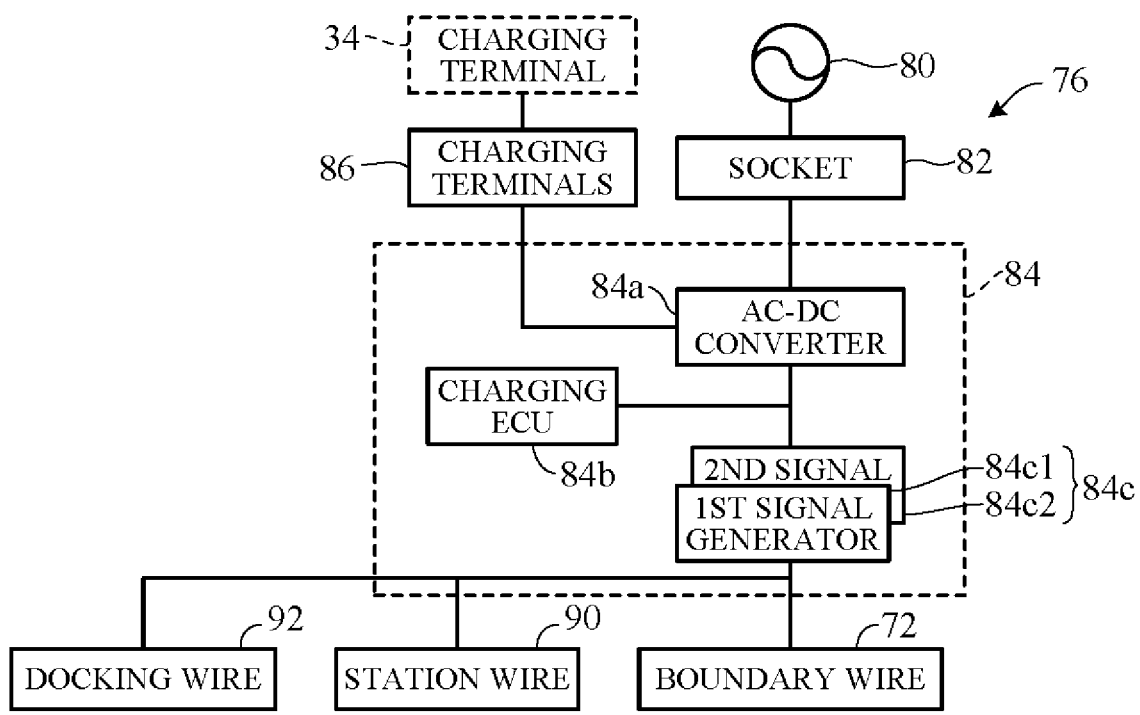
FIG. 5 is a block diagram showing configuration of a charging station of the utility vehicle shown in FIG. 4.

FIG. 5 is a block diagram showing electrical configuration of the charging station 76;

As shown in FIG. 5, the charging station 76 is equipped with a charger 84 connected through a socket 82 to a commercial power supply 80, and a pair of charging terminals 86 connected to the charger 84 and connectable to contact contacts 34a (shown in FIG. 2) of the pair of charging terminals 34 of the vehicle 10.

The charger 84 is equipped with an AC-DC converter 84a, a charging ECU (Electronic Control Unit) 84b also comprising a microcomputer and used to control operation of the AC-DC converter 84a, and two signal generators 84c (first signal generator 84c1 and second signal generator 84c2).

The charging station 76 is configured so that alternating current passing from the commercial power supply 80 through the socket 82 is converted to direct current and is stepped down to a suitable voltage by the AC-DC converter 84a of the charger 84 and sent to the charging terminals 86 to charge the onboard battery 32 through the charging terminals 32 and 86 when the vehicle 10 is returned and connected to the charging station 76. The AC-DC converter 84a steps down the current to a suitable voltage in response to commands determined by the ECU 44 and sent from the charging ECU 84b.

At the same time, the output of the AC-DC converter 84a is supplied to the charging ECU 84b and signal generators 84c (comprising a first signal generator 84c1 and a second signal generator 84c2). The charging ECU 84b is configured to be capable of communicating with the ECU 44 and controls operation of the first signal generators 84c1 and the second signal generator 84c2 by sending binary data pulses.

In response thereto, the first and second signal generators 84c1, 84c2 convert the direct current stepped down by the AC-DC converter 84a into area signal in continuance sequence of pulse train and supply the generated area signal to the boundary wire 72, a station wire 90 for delineating the charging station 76a and a docking wire 92 for guiding the vehicle 10 to a charging position.

Figure 6:
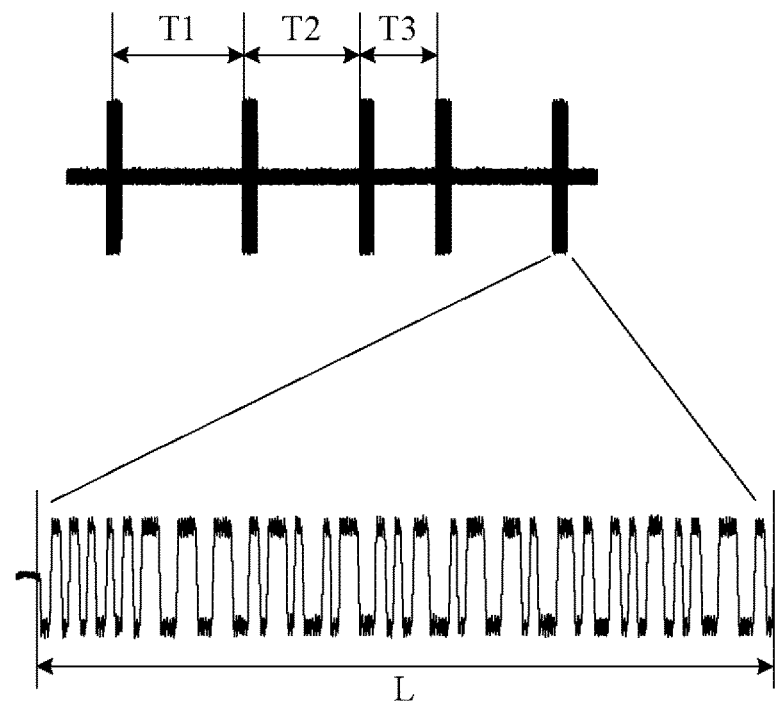
FIG. 6 is an explanatory diagram showing data signal of pulse train generated by a signal generator illustrated in FIG. 5.

FIG. 6 shows the area signal of pulse train generated by the first signal generator 84c1 to be passed through the boundary wire 72 that is corresponding to the binary data pulses sent from the charging ECU 84b. As shown, the area signal has a signal length L and is supplied to the boundary wire at random periods Tn. Although not shown, the second signal generator 84c2 generates similar data signal.

Figure 4:
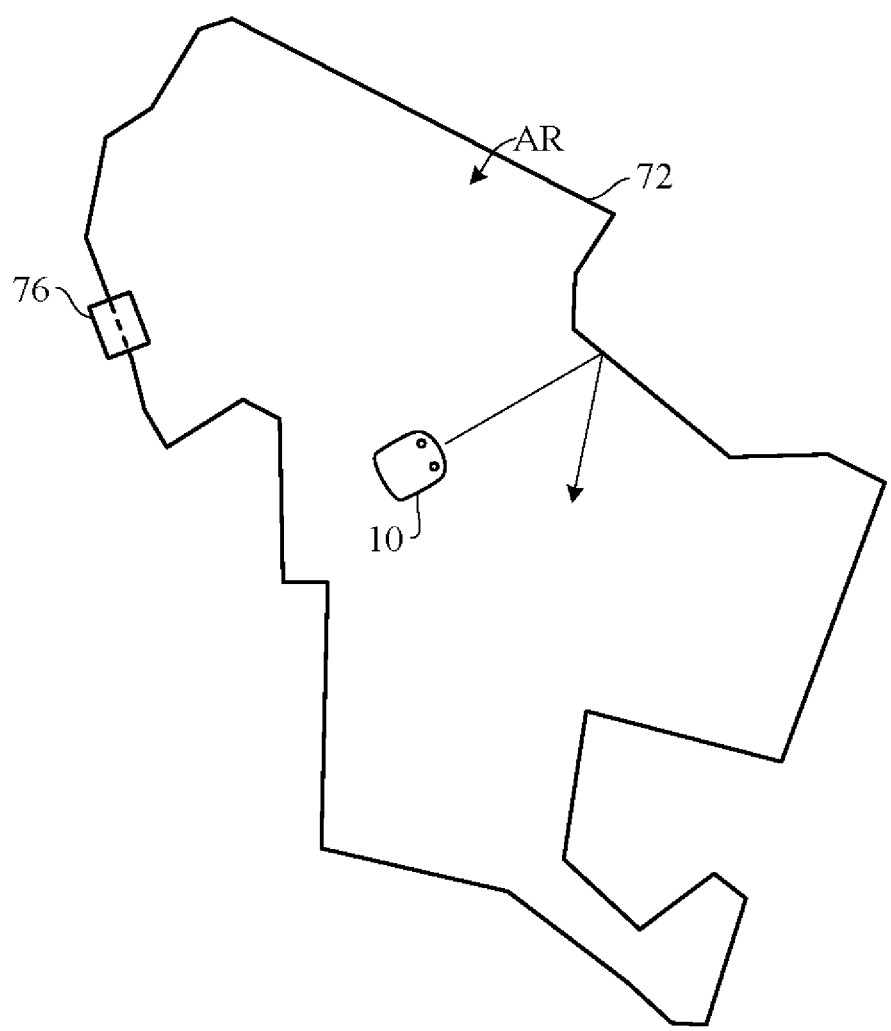
FIG. 4 is an explanatory diagram showing a working area (delimited by a boundary wire) of the utility vehicle illustrated in FIG. 1.

The detection of the working area AR shown in FIG. 4 will then be explained.

When electric current of the data signal shown in FIG. 6 is supplied to the boundary wire 72 by the first signal generator 84c1, a right-handed magnetic field is generated around the boundary wire 72 (Ampere's right-hand screw rule). The magnetic field intensity detected at this time differs depending on the total length of the boundary wire 72 and also differs with distance of the vehicle 10 from the boundary wire 72.

Figure 7:
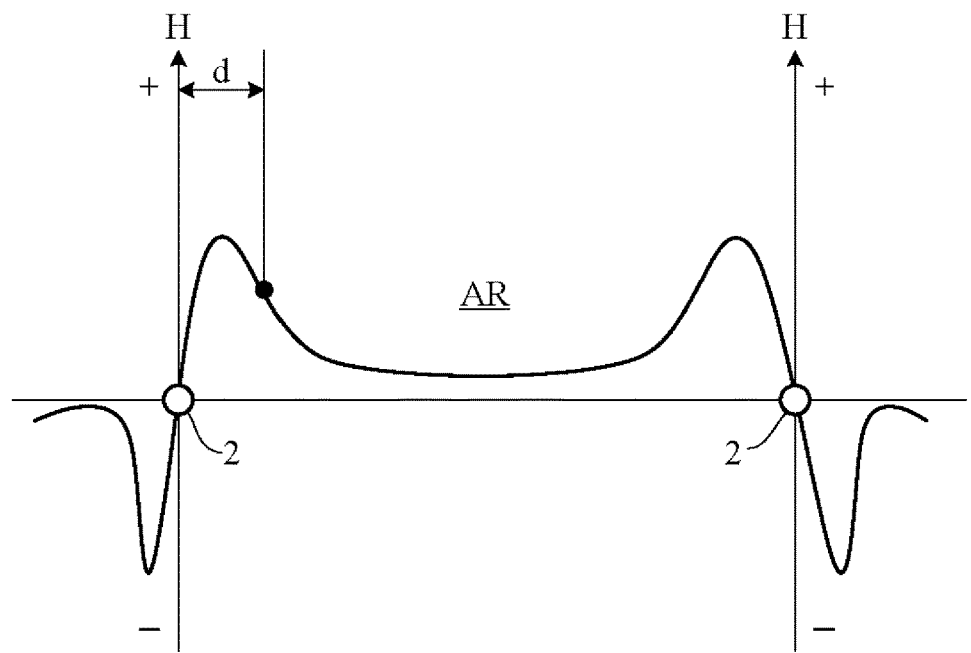
FIG. 7 is an explanatory diagram showing relationship between distance from the boundary wire and magnetic field strength generated by the data signal of FIG. 6.

FIG. 7 is a diagram showing relationship between distance d from the boundary wire 72 and magnetic field strength H. As indicated in FIG. 7, magnetic field strength H varies with distance d from the boundary wire 72. Specifically, magnetic field strength H is 0 above the boundary wire 2, positive inside the working area AR, and negative outside the same.

When work is in progress, the ECU 44 reads outputs of the magnetic sensors 36L, 36R and detects the position of the vehicle 10 in the working area AR. Specifically, the ECU 44 determines whether the vehicle 10 is inside or outside the working area AR and detects distance of the vehicle 10 from the boundary wire 72.

More specifically, the ECU 44 reads outputs of the magnetic sensors 36L, 36R and when the outputs are minus, drive the vehicle 10 to turn toward inside the working area AR at a random angle based on, for example, the output of the angular velocity sensor 46. As a result, work can be carried out inside the working area AR while the vehicle 10 is being driven to run straight forward at random direction, for example.

In the present embodiment, the vehicle 10 is controlled to operate in work mode and return mode in response to control commands sent from the ECU 44 in accordance with programs prepared beforehand and memorized in the memory 44c. In work mode, the vehicle 10 works (mows lawn or grass) while autonomously navigating in the working area AR. In return mode, the vehicle 10 is returned to the charging station 76 when the battery 32 requires charging. In work mode or return mode, the vehicle 10 is sometimes controlled to trace along the boundary wire 72. For example, this trace mode is executed before work mode to ascertain the working area AR as will be later explained.

Figure 8:
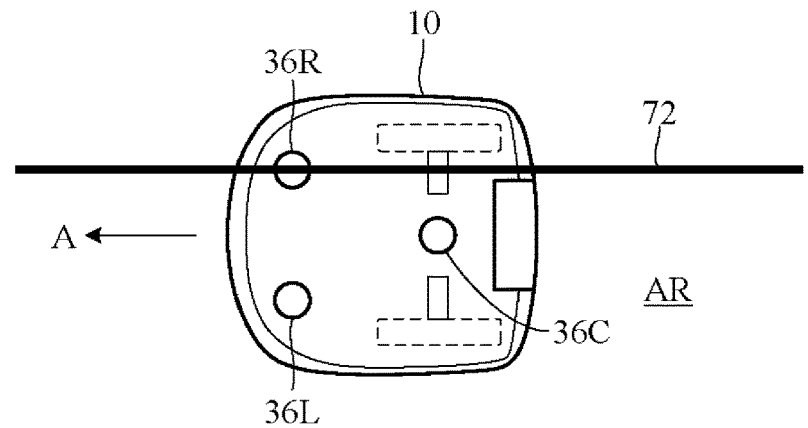
FIG. 8 is an explanatory diagram showing operation in trace mode of the vehicle illustrated in FIG. 1.

FIG. 8 is a diagram showing operation of the vehicle 1 in trace mode. As shown in FIG. 8, in trace mode the vehicle 1 is driven by commands from the ECU 44 to circuit along the boundary wire 72 with one of the pair of magnetic sensors 36R and 36L (e.g., 36L) positioned inside the boundary wire 72 and so that the other magnetic sensor (e.g., 36R) moves above the boundary wire 72 in the direction of arrow A. Specifically, the ECU 44 monitors output of the magnetic sensor 36R and controls operation of the drive motors 26L and 26R so that magnetic field strength H detected by the magnetic sensor 36R stays at 0.

For example, when magnetic field strength H detected from the output of the magnetic sensor 36R becomes positive, the vehicle 10 is turned rightward by decelerating right drive motor 26R and accelerating left drive motor 26L. On the other hand, when magnetic field strength H detected from the output of the magnetic sensor 36R becomes negative, the vehicle 10 is turned leftward by accelerating the right drive motor 26R and decelerating the left drive motor 26L. As a result, the right magnetic sensor 36R is brought near the boundary wire 72 and magnetic field strength H detected by the right magnetic sensor 36R is maintained at 0, so that the vehicle 10 can run on the boundary wire 72.

Trace mode is started from a state in which the terminals 34 of the vehicle 10 are connected to the terminals 86 of the charging station 76 and ends when the terminals 34 again connect to the terminals 86 after the vehicle 10 makes a circuit along the boundary wire 72. Position of the vehicle 10 from the start to the end of trace mode is successively detected from the output of the GPS receiver 54.

Based on the outputs of the GPS receiver 54 and the direction sensor 52, the ECU 44 generates a map of the working area AR (working area map MP) whose origin (starting point) is set at the charging station 76 based on the working area boundary line identified in trace mode.

Figure 9:
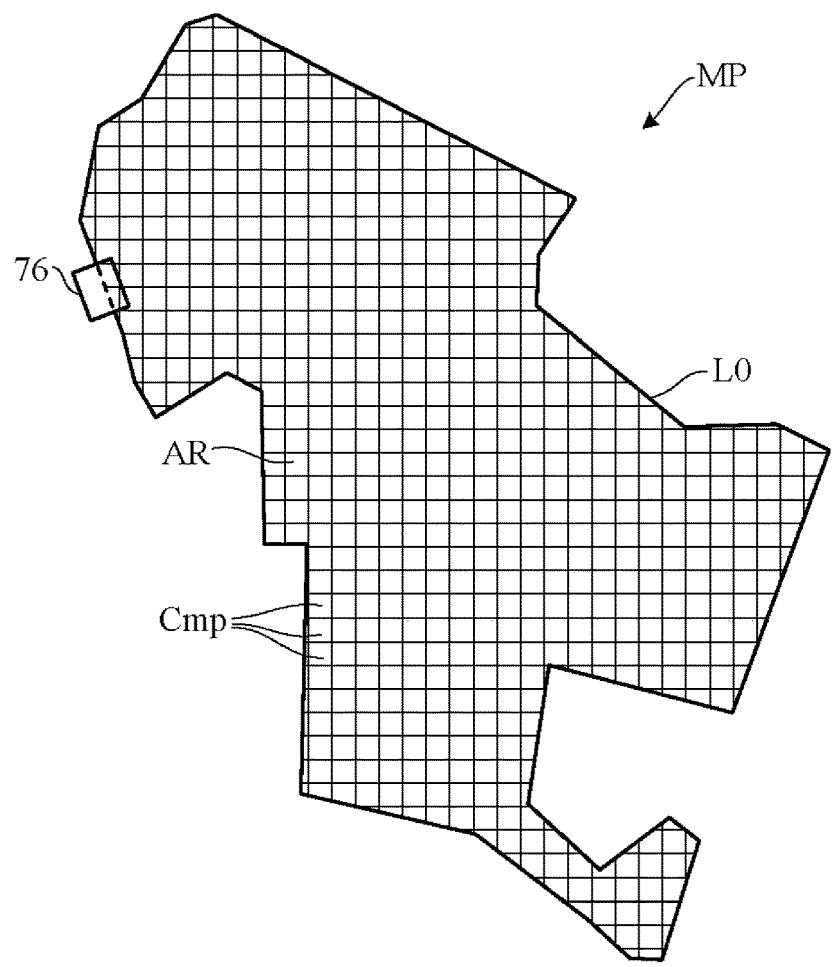
FIG. 9 is an explanatory diagram showing an example of a map of the working area illustrated in FIG. 4.

FIG. 9 is a diagram showing an example of the working area map MP. In the map MP, position of the boundary wire 72 is depicted as the boundary line (L0). More specifically, the map MP is configured by arraying the square cells Cmp in a grid pattern within a rectangular coordinate system plane including an X axis and a Y axis (XY plane) corresponding to inside of the working area AR. The plane is set with a reference orientation with respect to an origin corresponding to the position of the charging station 76. Each cell Cmp includes position data of X, Y coordinate. Size of the cells Cmp can be varied as appropriate and can, for example, be defined to coincide with working width of maximum outer diameter of blade 20.

Moreover, as shown in FIG. 1, the blade 20 is provided with a blade height adjustment motor 100 for vertically adjusting the height of the blade 20 from ground surface GR.

As shown in detail in FIG. 10, the blade height adjustment motor (hereinafter sometimes called "height adjustment motor") 100 is equipped with a drive gear 100a, a driven gear 100b meshed with the drive gear 100a, and a ratchet 110c for impeding over-rotation of the drive gear 100a, and the driven gear 100b is connected to the blade 20.

Therefore, when power is applied to drive the height adjustment motor 100, the blade 20 is moved vertically upward or downward to adjust its height from the ground surface GR. A photosensor 102 installed near the driven gear 100b produces an output indicating height of the blade 20 relative to the frame 12b and, indirectly, height of the blade 20 from the ground surface GR.

Figure 10:
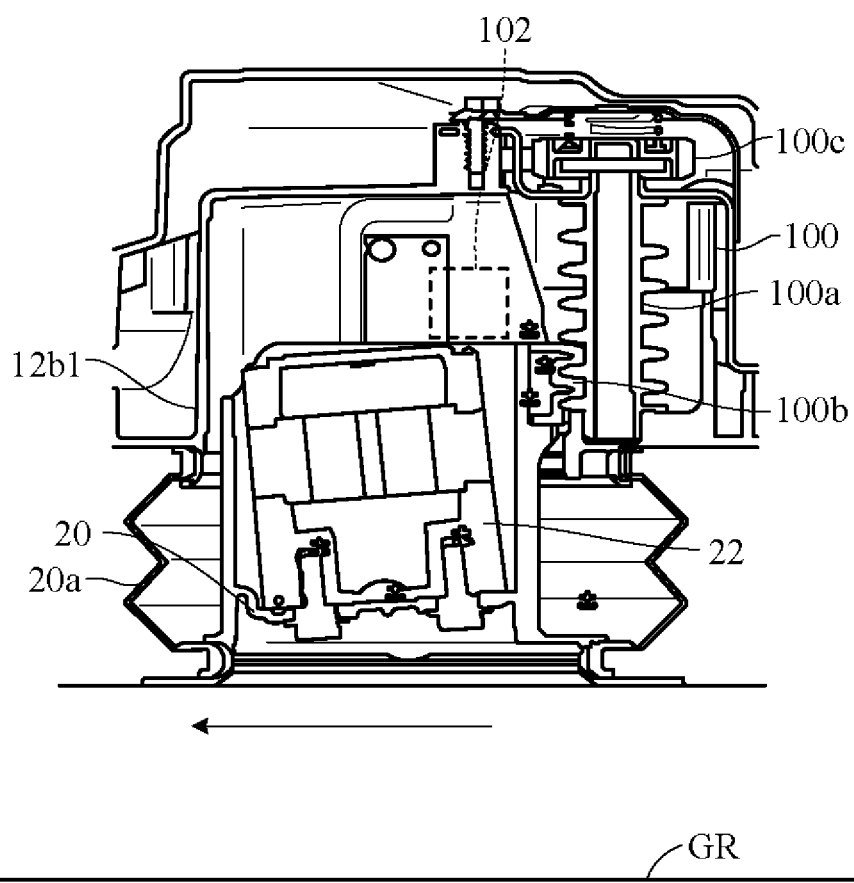
FIG. 10 is an explanatory diagram showing a blade height adjustment motor shown in FIG. 1.

In FIG. 10, reference symbol 12b1 indicates a bottom region of the frame 12b and symbol 20a indicates a hood of the blade 20. As illustrated, the blade 20 is attached to the frame 12b so as to descend forwardly toward the front (arrow direction) of the vehicle 10. The output of the photosensor 102 is sent to the ECU 44, and the ECU 44 adjusts the height of the blade 20 by controlling operation of the height adjustment motor 100 based on input value from the photosensor 102.

As the utility vehicle according to this embodiment is characterized by means of adjusting the vehicle 10 work schedule, the explanation that follows is focused on this point.

Figure 11:
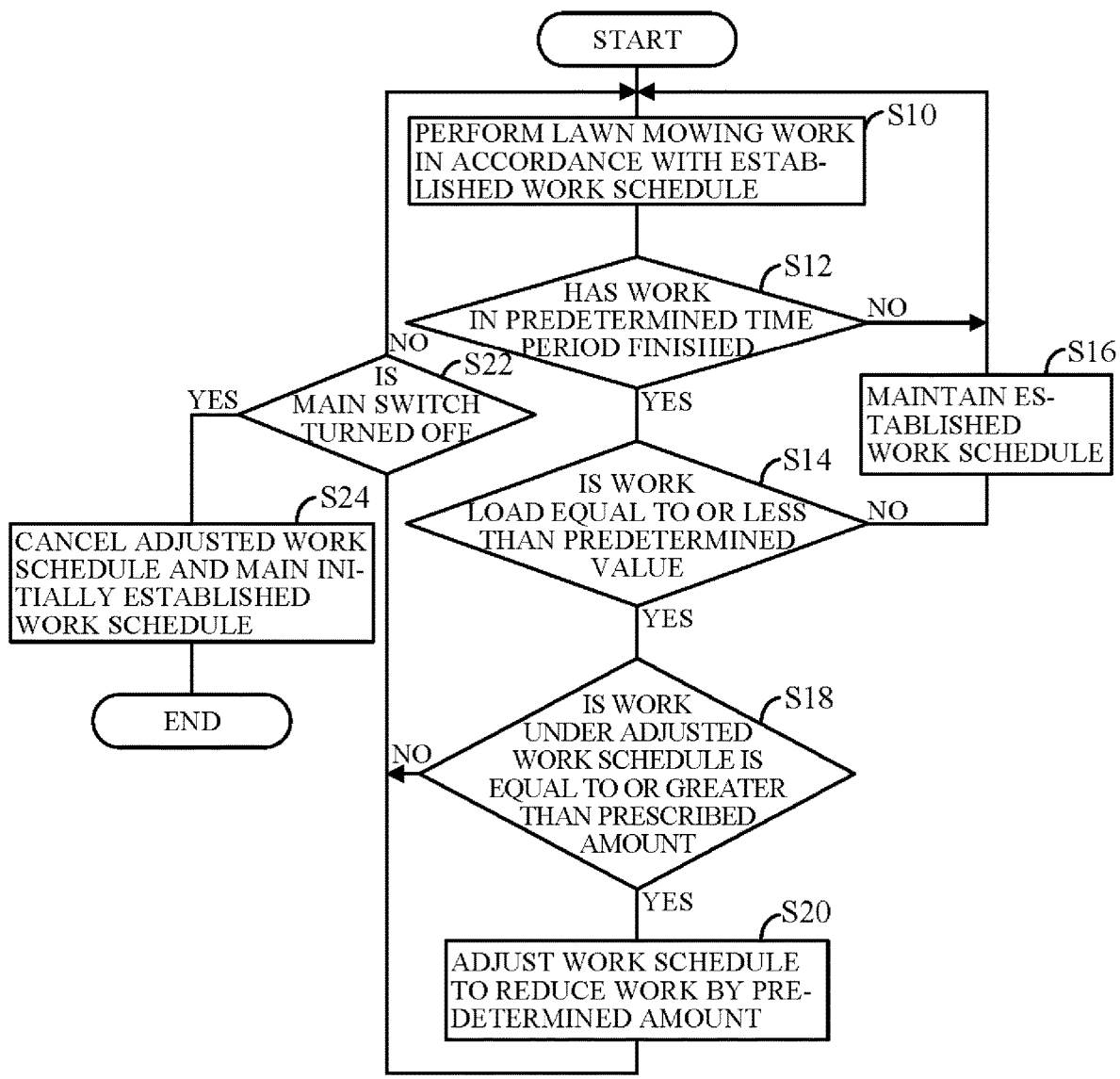
FIG. 11 is a flowchart showing operation of the utility vehicle illustrated in FIG. 1.

FIG. 11 is a flowchart showing operations of the utility vehicle 10. The program shown is executed by the ECU 44. To be more exact, as seen in FIG. 3, the ECU (44) having a CPU (microprocessor 44a) and the memory (44b), wherein the microprocessor is configured to function as: a work load determining unit (or determining means) 44a1 and a work schedule adjusting unit (or adjusting means) 42a2, and the processing shown in FIG. 10 is performed by these units.

Now to explain, after execution of the illustrated program is commenced upon the user turning ON the main switch 64, first, in S10, lawn mowing work is performed in accordance with a work schedule established by the user. The user sets up the program by operating the input device 68 in accordance with instructions shown on the display 70 in response to turn-on of the main switch 64.

As the vehicle 10 is an autonomously navigating utility vehicle, most users ordinarily turn on the main switch 64 in spring of the year, for example, and leave it that way until turning it off when autumn or winter arrives.

Figure 12:
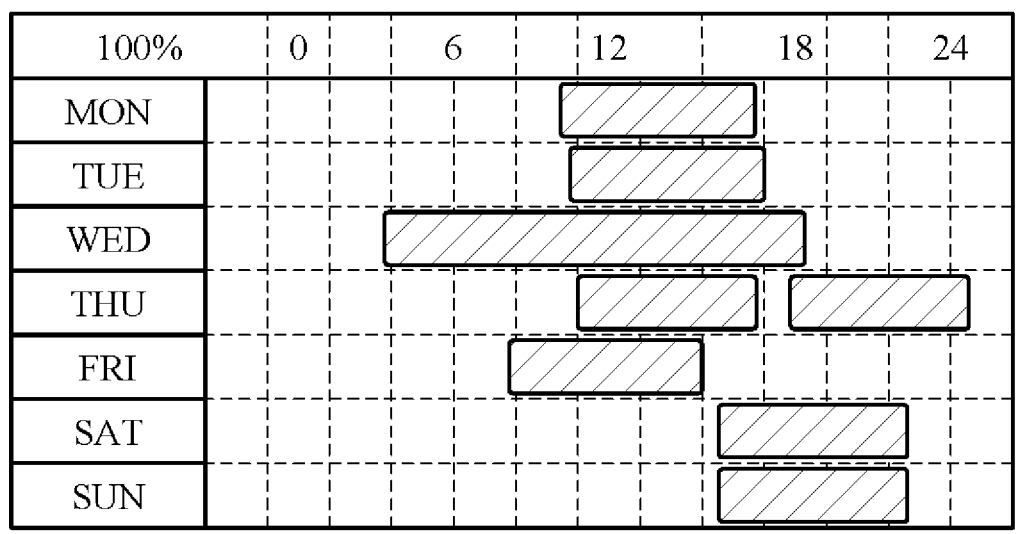
FIG. 12 is an explanatory diagram showing an initially established work schedule referred to in the flowchart of FIG. 11.

FIG. 12 an explanatory diagram showing a work schedule inputted by the user (initially established work schedule). As shown, the work schedule is set up to perform work during the days of the week at the time periods between 12 a.m. and 12 p.m. indicated by hatching. The ECU 44 controls operations of the work motor 22, drive motors 26 and blade height adjustment motor 100 to perform lawn mowing work in the working area AR in accordance with the established work schedule.

Next, in S12, it is determined whether work in a predetermined time period, e.g., a period between 1 and 3 days, has finished, and when the result is NO, the program returns back to S10, and when YES, goes to S14, in which it is determined whether work load is equal to or less than a predetermined value.

As the work unit comprises the blade 20 and the work motor 22 constituted of an electric motor, load here means current consumption of the work motor 22, the determination in S14 is done by determining whether current consumption of the work motor 22 detected by the current sensor 62 is equal to or less than a predetermined value.

Average value of load (i.e., current consumption) of the work motor 22 during a prescribed period, e.g., one year, is calculated, and the calculated value is set as the predetermined value. The prescribed period can be the same as the predetermined period of S12.

The processing from S10 to S14 amounts to determining whether load of the work unit, i.e., the work motor 22 driving the blade 20 in work performed in accordance with the established work schedule in the predetermined period is equal to or less than the predetermined value.

When the result in S14 is NO, i.e., when it is determined that load is not equal to or less than the predetermined value, the program goes to S16, in which the initially established work schedule is maintained unmodified. In other words, the initial work schedule established by the user, such as the one shown in FIG. 12, is maintained without modification.

On the other hand, when the result in S14 is NO, i.e., when load is determined to be equal to or less than the predetermined value, the program goes to S18, in which it is determined whether work under an adjusted work schedule is equal to or greater than a prescribed amount, more specifically until work reduced in accordance with an adjusted work schedule has reached a prescribed amount, When the result in S18 is YES, the program goes to S20, in which the work schedule established by the user is adjusted to reduce work performed under the work schedule concerned by 5% (predetermined amount).

Prescribed amount means minimum required value in the work and can be the same as the predetermined amount of S20 or can be a value different from the predetermined amount of S20.

Next, in S22, it is determined whether the user turned OFF the main switch 64. As stated above, the main switch 64 is rarely turned OFF in the absence of a major seasonal change, so the result in S22 is usually NO and the program goes to S10 to repeat the foregoing processing.

The result of thus repeating the processing from S10 to S22 is that when load is determined not to be equal to or less than the predetermined value, the established work schedule is maintained, while, in contrast, each time load is determined to be equal to or less than the predetermined value, the established work schedule is adjusted to reduce work performed in accordance with the established work schedule by the predetermined amount, which is to say that the established work schedule is adjusted to reduce work incrementally by the predetermined amount until reaching the prescribed amount.

Figure 13:
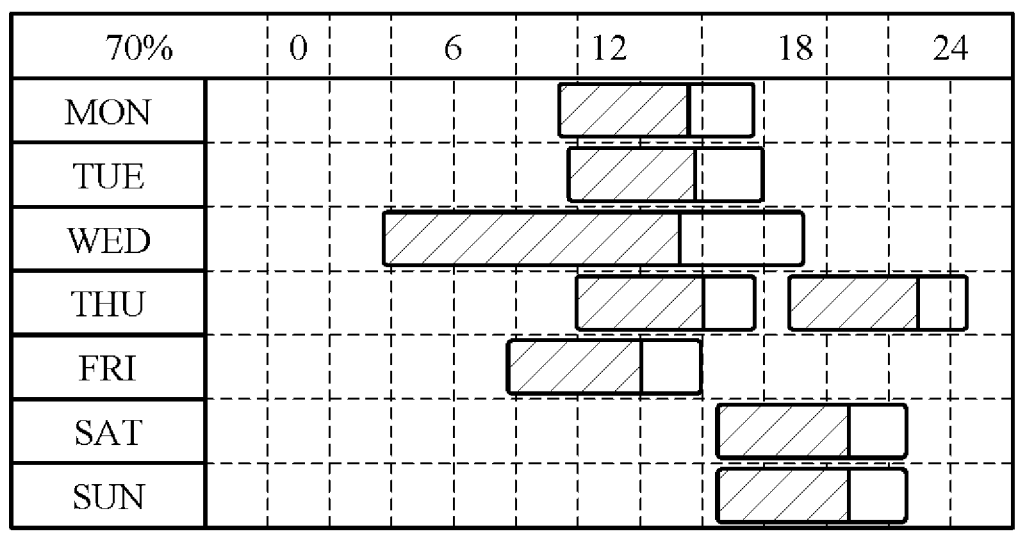
FIG. 13 is an explanatory diagram showing an adjusted work schedule referred to in the flowchart of FIG. 11.

FIG. 13 is an explanatory diagram of an adjusted work schedule showing a case where work was reduced 30% by the aforesaid processing.

On the other hand, when the result in S22 of the flowchart of FIG. 11 is YES, the program goes to S24, in which the established work schedule is reset to maintain the work schedule initially established by the user, whereafter the program is terminated.

The work schedule established by the user consulted in S10 or the adjusted work schedule in S20 are also saved by storage in the EEPROM of a memory 44c when the main switch 64 is turned OFF.

As stated above, the present embodiment is configured to have a utility vehicle (10) that runs a working area (AR) to perform work with a work unit (blade 20, work motor 22) and method for operating the vehicle, characterized by: an electronic control unit (ECU 44) having a microprocessor (44a) and a memory (44b), wherein the microprocessor is configured to function as: a work load determining unit (44a1, S10, S12) configured to determine whether load of the work unit (20), more specifically load of the work motor (22) constituting the work unit in work performed in accordance with an established work schedule is equal to or less than a predetermined value; and a work schedule adjusting unit (44a2, S14-S24) configured to adjust the established work schedule to reduce work when the load determining unit determines that the load is equal to or less than the predetermined value.

With this, it becomes possible to make the user free from troublesome work schedule adjustment and to let the work unit perform work properly by determining load of the work unit and by reducing the work if needed.

In the vehicle and method, the work schedule adjusting unit maintains the established work schedule (S16) when the load determining unit determines that the load is not equal to or less than the predetermined value.

With this, in addition to the effects and advantages, it becomes possible to avoid reducing work unnecessarily.

In the vehicle and method, the work schedule adjusting unit adjusts the established work schedule to reduce work by a predetermined amount every or each time the load determining unit determines that the load is equal to or less than the predetermined value (S20).

With this, in addition to the effects and advantages, it becomes possible to let the work unit work more properly.

In the vehicle and method, the work schedule adjusting unit adjusts the work schedule to reduce work by a predetermined amount until reduced work has reached a prescribed amount (S18).

With this, in addition to the effects and advantages, it becomes possible to let the work unit work more properly while securing required minimum work.

In the apparatus and method, the work schedule adjusting unit configured to cancel the adjusted work schedule and maintain the established work schedule when a switch (main switch 64) is turned off.

With this, in addition to the effects and advantages, it becomes possible to avoid overlooking of work schedule in the next season.

In the vehicle and method, the predetermined value is an average value of the load of the work unit during a prescribed period.

With this, in addition to the effects and advantages, it becomes possible to determine load of the work unit appropriately.

In the vehicle and method, the work unit includes a mower blade (20) whose height from ground surface (GR) is made adjustable.

With this, in addition to the effects and advantages, it becomes possible to perform work more effectively.

In the above, it should be noted that value (a period between 1 and 3 days) of the predetermined time period are examples and should not be limited thereto.

It should further be noted that although the utility vehicle is applied for a lawn mowing or grass mowing, it may be applied to any other type of works.

While the present invention has been described with reference to the preferred embodiments thereof, it will be understood, by those skilled in the art, that various changes and modifications may be made thereto without departing from the scope of the appended claims.

What is claimed is:

1. A utility vehicle configured to run a working area to perform lawn mowing work with a mower blade, comprising:
   an electric motor configured to drive the mower blade;
   a current sensor configured to detect current consumption of the electric motor; and
   an electronic control unit having a microprocessor and a memory, wherein
   the microprocessor is configured to:
      control the utility vehicle to perform the lawn mowing work in accordance with a work schedule established for each first predetermined time period;
      when the lawn mowing work has finished in a second predetermined time period, determine whether the current consumption in the lawn mowing work performed in accordance with the work schedule is equal to or less than a predetermined value;
      determine whether reduced work time of an adjusted work schedule, in which work time of an initially established work schedule is reduced by a predetermined percentage, is equal to or greater than a prescribed amount when it is determined that the current consumption is equal to or less than the predetermined value; and
      adjust the work schedule to reduce work time of future lawn mowing work by the predetermined percentage of work time of the initially established work schedule when it is determined that the reduced work time is equal to or greater than the prescribed amount, while maintaining the work schedule when it is determined that the reduced work time is not equal to or greater than the prescribed amount, wherein
   the predetermined value is an average value of the current consumption during a prescribed period.

2. The utility vehicle according to claim 1, further comprising:
   a switch, wherein
   the microprocessor is configured to:
      reset the work schedule to maintain the initially established work schedule before adjusting when the switch is turned off.

3. The utility vehicle according to claim 1, wherein a height of the mower blade from ground surface is adjustable.

* * * * *